No. 11,959.
Reissued Dec. 24, 1901.
A. R. FERGUSSON (& S. CHASE, Dec'd.)
COMBINED LOCK AND LATCH.
(Application filed Apr. 19, 1901.)
2 Sheets—Sheet 1.
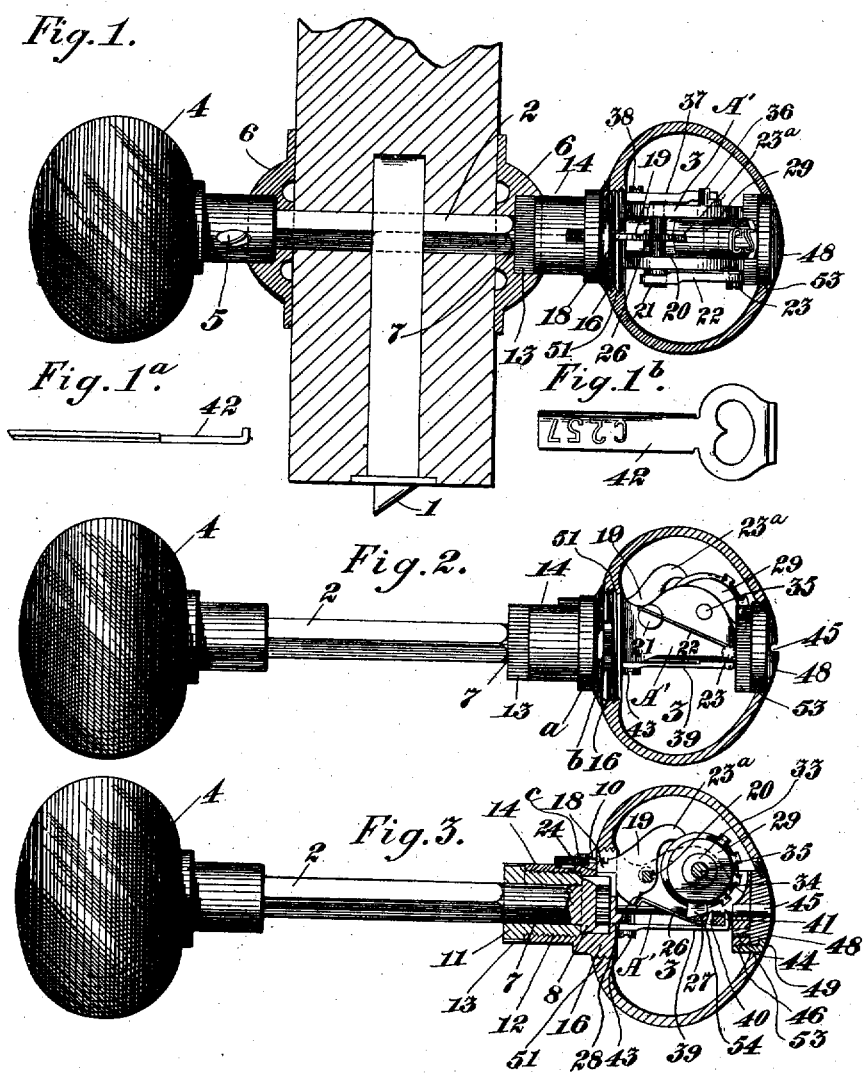
Witnesses:
Ig. Rosenberg
F. A. Hanland
Inventors:
Alan R. Fergusson, and
Solon Chase, Dec'd.
By their Attorney:
F. H. Richards.
THE NORRIS PETERS CO., PHOTO-LITHO., WASHINGTON, D. C.

No. 11,959.
Reissued Dec. 24, 1901.
A. R. FERGUSSON (& S. CHASE, Dec'd.)
COMBINED LOCK AND LATCH.
(Application filed Apr. 19, 1901.)
2 Sheets—Sheet 2.
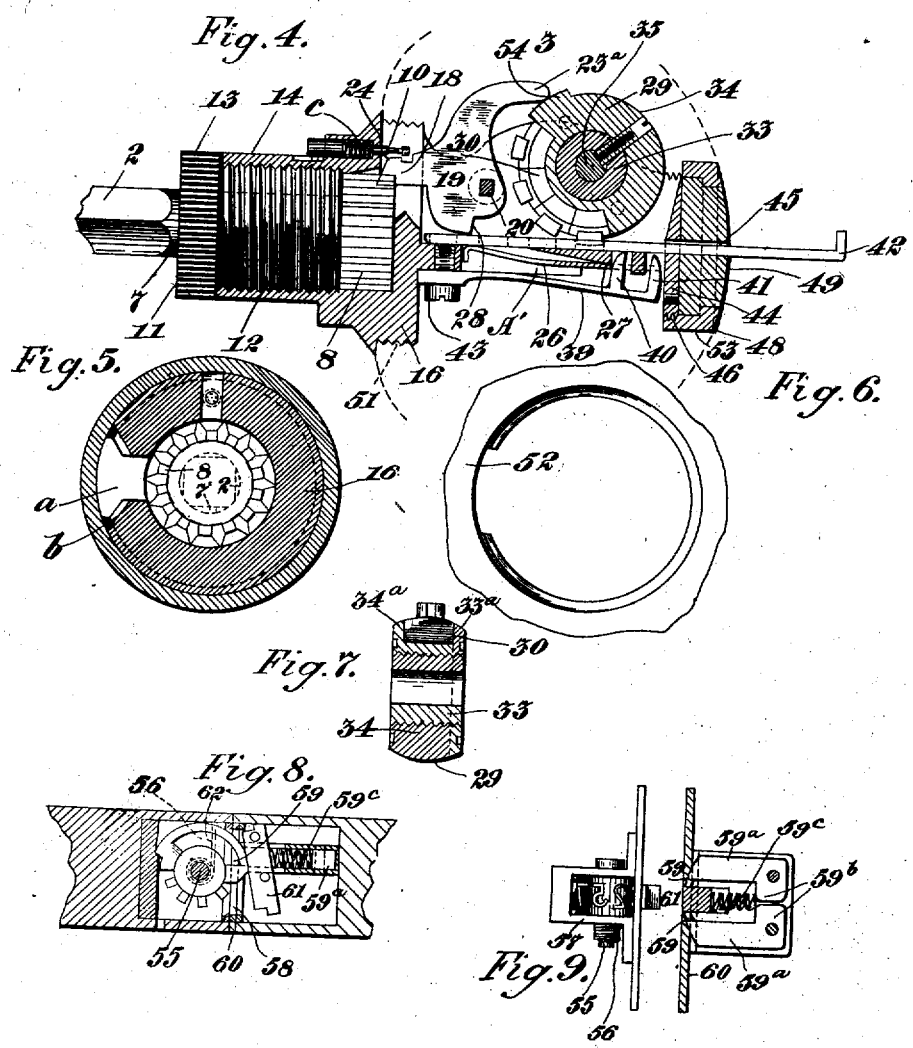
Witnesses:
J. J. Rosenberg.
F. W. Hanland
Inventors:
Alan R. Fergusson,
Solon Chase, Dec'd.
By their Attorney:
F. H. Richards.
THE NORRIS PETERS CO., PHOTO-LITHO., WASHINGTON, D. C.

UNITED STATES PATENT OFFICE.

ALAN ROBB FERGUSSON, OF MOUNT VERNON, NEW YORK, (AND SOLON CHASE, DECEASED,) ASSIGNORS, BY DIRECT AND MESNE ASSIGNMENTS, TO THE FERGUSSON LOCK COMPANY, A CORPORATION OF NEW JERSEY.

COMBINED LOCK AND LATCH.

SPECIFICATION forming part of Reissued Letters Patent No. 11,959, dated December 24, 1901.

Original No. 617,648, dated January 10, 1899. Application for reissue filed April 19, 1901. Serial No. 56,664.

*To all whom it may concern:*

Be it known that I, ALAN ROBB FERGUSSON, a resident of Mount Vernon, in the county of Westchester and State of New York, formerly of Denver, in the county of Arapahoe and State of Colorado, and SOLON CHASE, deceased, late of Denver, in the county of Arapahoe and State of Colorado, have invented certain new and useful Improvements in a Combined Lock and Latch; and I do hereby declare the following to be a full, clear, and exact description of the invention, such as will enable others skilled in the art to which it appertains to make and use the same.

The invention relates to an improvement in combined locks and latches, the object of the invention being to provide an improved device which will fit and be inclosed in a door-knob and adapted to be operated by a key passing through a keyhole in the knob.

A further object of the invention is to provide, in combination with a latch or bolt controlled by a knob or analogous device, improved means whereby the operation of the latch or bolt by the knob or analogous device may be effected when certain parts of the mechanism are operated by means of a key and when not so operated the actuation of the latch or bolt cannot be obtained through the medium of the knob.

A further object of the invention is to provide an improved device simple and compact in its construction and organization, inexpensive to manufacture, and effective in its operation.

With these objects in view the invention consists in certain novel features of construction and combinations and organization of parts, as will be more fully hereinafter set forth, and pointed out in the claims.

In the drawings accompanying and forming part of this specification, Figure 1 is a view, partly in section, showing the application of the improvement to a door latch or bolt. Figs $1^a$ and $1^b$ are views illustrating the key. Fig. 2 is a view showing the spindle, an ordinary knob at one end, and this improved knob-lock at the other end, the knob containing the lock being shown in section. Fig. 3 is a similar view with parts of the lock mechanism in section. Fig. 4 is an enlarged sectional view illustrating the lock with the key inserted therein, the knob being shown in dotted lines. Fig. 5 is a transverse sectional view taken in line *a a*, Fig. 4. Fig. 6 is a view of the inner end of the knob. Fig. 7 is a sectional view of the tumbler which effects the connection between the knob and the spindle. Figs. 8 and 9 are sectional views illustrating a modification.

The present improvement comprises, in combination with a latch or bolt, means (shown herein as rotary means and designated herein for the present purposes as a "tumbler") having a projection, a device in engagement with said projection, and a device, such as a spring, for maintaining said device in engagement with such tumbler during a predetermined period, the organization being such that until the engagement of the key with one of said devices and the release thereof from the part with which it engages the operation of the latch or bolt into its unlocking position cannot be effected.

The improvement further comprises, in combination with a latch or bolt, mechanism embodying means designated herein as a "tumbler," a device in engagement with or controlled thereby, and means for preventing the operation of said device until released by the proper key.

In the form thereof herein shown and described, which may be its preferred form, if desired, this improved lock 3 is shown in connection with an ordinary latch 1, having a spindle 2 for operating said latch. One end of the spindle may be provided with an ordinary knob 4, secured thereto by some suitable means, such as a screw 5. In the organization shown the usual escutcheons 6 6 are secured to each side of the door at diametrically opposite points to form bearings for the knobs.

The spindle 2 is preferably made cylindrical at one end to form a bearing 7 and is shown provided with a head or enlargement 8, on which a series of teeth or pins are provided to coöperate with the means for connecting the knob with the spindle, and which means is shown herein as a lever having a projection or tooth 18. A bearing-sleeve 11 is mounted to rotate in one of the escutcheons 6 and is provided at one part thereof with screw-threads 12 to engage corresponding screw-threads in a flange or cylindrical member 14 of the knob-shank 16. The bearing-sleeve 11 is provided at a point where the screw-threads stop with a flange 13 to form a seat for the knob-shank and thereby make a neat joint therewith.

A blind key *a* may be placed in a slot *b* in the shank (see Figs. 2 and 5) and is adapted when the knob is screwed onto the shank to engage a shoulder on said knob (see Fig. 6) and prevent its removal from the shank by unauthorized persons. In inserting the blind key it is placed in the slot *b* in the shank and after the knob has been screwed onto the shank the device is so manipulated as to cause the key to drop into engagement with the shoulder on the knob, in which position it will be retained by the upper end of the spindle when inserted, as shown in Fig. 5.

The knob-shank 16 is provided with a slot or hole 17, through which a tooth or projection 18 on an arm or lever 19 is adapted to pass. This arm or lever 19 is secured on a shaft or arbor 20, journaled in the lock frame or casing A′, and said arbor is shown provided at one end with an enlargement or head 21, having a flat face, against which a spring 22 bears. This spring is secured to the side of the frame in some suitable way, as by means of a screw or pin 23, and serves by engagement with the flat face on the head 21 of the arbor to normally press the part 23ª of said lever against the periphery of the lever-actuating device, (designated for the present as a "tumbler" 29.) The arm or lever 19 is provided with a shoulder 24, which normally rests in the path of a pin 10, which extends outside the shank of the knob and is provided with a spring *c*, which normally holds the pin in its outward position. When, however, the arm or lever 19 is actuated to throw the tooth 18 into engagement with the teeth on the end of the spindle, the pin 10 can be pushed inward to engage the shoulder on said lever 19 and so hold said lever in such position that it will lock the knob to the spindle, so that the spindle can be turned by the knob to unlatch the door whenever the knob is turned.

To prevent the lever or arm 18 from being shifted into position to connect the knob with the spindle except at the proper time by the turning of the tumbler, suitable means is provided. This means in the present instance is shown as a spring 26, secured to the lock-frame A′, as shown, for instance, at 27, and which spring is adapted to normally rest against a shoulder 28 on the lever 19, whereby to prevent the unlocking of the device by simply throwing the tumbler 29, which will be more fully hereinafter described, it being obvious that until such spring is shifted the shifting of the lever 19 by the turning of the tumbler cannot be effected, so that the picking of the lock cannot be accomplished, since owing to the organization hereinafter specified the operation of the spring by the insertion of a device other than the proper key is not possible. This improved rotatable tumbler 29, which is shown as a cylinder or barrel shaped member and may be considered to constitute the controlling means for the latch or bolt, is provided, preferably in its periphery, with a groove or recess 30 to receive and removably hold projections, such as raised letters, figures, or other characters, which may be changed or interchanged to form different locking combinations should it be desired to do so. The tumbler is preferably constructed in two parts 33 and 34, the part 33 being externally screw-threaded to enter the threaded opening in the part 34, which part 34 is provided with a groove or recess 30 to receive the letters or figures comprising the combination, such letters or figures being securely clamped in place by the peripheral portions 33ª and 34ª of the respective parts of the tumbler. This tumbler is secured on a shaft or arbor 35 in any suitable way, as by means of a screw, which arbor is provided at one end with an enlargement or head 36, having a flat face, against which a spring 37 is adapted to rest, which spring 37 is secured to the frame A′ by means of a screw or pin 38.

A spring 39 is secured to the frame by means of a screw or pin 43 and is provided with projections 40 41, which are adapted to extend through slots in the frame and normally rest in the path of the key, such device being effective to interfere with the insertion of a device other than the proper key and so assist in preventing the picking of the lock.

Secured to the outer end of the lock-frame A′ is a circular portion 44, provided with a keyhole 45 and screw-threaded on its outer edge, as shown at 46, to mesh with screw-threads in a collar 48, whereby to secure in place a plate 49, provided with a keyhole in alinement with the keyhole 45. The plate 49 is preferably made of hard metal and may be provided with phosphorescent composition to make the keyhole readily seen in the dark.

The knob-shank 16 is provided with screw-threads 50 in position to engage screw-threads 51 in the wall of the opening of the knob 52, which knob incloses the locking mechanism hereinbefore described. A suitable opening 53 is also provided in the knob to receive the collar 48 and a hard-metal plate 49, the device in the form shown presenting the appearance of an ordinary knob with the locking mechanism inclosed therein.

The key 42 for locking and unlocking the lock is shown provided with a beveled end and cut-out portions to correspond with the characters or figures on the tumbler, whereby when the key is inserted through the keyhole 45 the key will first force the projections 40 41 out of its path, then bear against the projection 54 and then engage each successive letter or numeral on the tumbler, turning the latter until the projection 54 is about to strike the lever 19 in order to throw the same into position to engage the spindle, when the end of the key will engage the spring 26 and so release the lever 19 and permit the projection 54 to force the lever to its unlocking position or that position in which it will connect the knob with the spindle and so permit the latch or bolt to be unlocked, whereby such arm 18 will engage one of the teeth on the end of the spindle, whereupon the knob can be operated to turn the spindle and withdraw the latch. When the lever is in this position, the pin 10 can be pushed inwardly and made to engage the shoulder on the lever 19 and hold the lever in position to connect the knob with the spindle, when the key can be withdrawn and the knob can still be manipulated to operate the latch. When the key has been withdrawn, the lever 19 will be moved slightly by the spring 22, so as to cause the shoulder 24 on said lever to rise and engage the headed end of pin 10. When it is desired to lock the door, it is simply necessary to insert the key, which will cause the tumbler to be rotated and the projection 54 thereon to engage the part 23[a] of lever 19 and move said lever sufficiently to disengage the shoulder 24 from the headed end of pin 10, and thus release the pin 10 and permit the lever 19 to assume its normal position out of engagement with the pins or teeth 9 when the key has been withdrawn. It will now be impossible to open the door by means of the knob, since it will turn on the spindle.

It will be seen that the combination of letters and numerals on the tumbler can readily be interchanged, which will of course necessitate the use of a new key with the numerals and letters arranged to accord with the changed combination.

This improved lock may be applied to a great many objects other than doors—as, for instance, to a desk-top, as shown in Figs. 8 and 9—or it may be applied to a window-sash, trunk, valise, and various other uses to which an ordinary lock is put.

In the form of the invention shown in Figs. 8 and 9 the tumbler is mounted on a shaft or arbor 55, which is provided with a coiled spring 56. This tumbler is preferably partly inclosed in a casing 57 and adapted to project through a slot 58 in such casing. The tumbler is provided with a series of letters and numerals on the periphery to be engaged by a key (not shown) with cut-out portions to correspond with the projections on the periphery of the tumbler. The tumbler is made with a curved slot 62 for the reception of locking-pins 59. These locking-pins are made at the outer ends of L-shaped arms 59[a], which may be pivotally attached to the portion 60 of a desk or similar article. A plate 61 is adapted to enter between the locking-pins 59 when the desk is opened, and between this plate and the members 59[b] of arms 59[a] a spring 59[c] is disposed.

It will be seen that when the part of the lock containing the tumbler is forced against the other portion of the lock the tumbler will force back the spring-plate 61 and permit the pins 59 to be forced into the opening 62 in the tumbler and lock the parts securely together. When it is desired to unlock the device, it is simply necessary to insert the key, which will turn the tumbler and gradually force the pins back and allow the plate 61 to come forward and hold the pins out of engagement with the tumbler, thus permitting the article to be opened.

Various changes may be made in the general form and organization of the several parts described without departing from the spirit and scope thereof, and hence it is to be understood that this invention is not limited to the details set forth, but such changes and alterations may be made as fairly fall within the spirit and scope of the invention.

Having fully described the invention, what is claimed, and desired to be secured by Letters Patent, is—

1. The combination, with a revoluble tumbler, of interchangeable peripheral projections on said tumbler, and a key having cut-out portions to correspond with the projections on said tumbler, and a locking-lever controlled by the tumbler.

2. The combination, with a knob and spindle, of a locking-lever carried by one part and having an arm to engage the other part; means for normally retaining said locking-lever in an unlocked position; a revoluble tumbler having peripheral projections; a key to coöperate with said peripheral projections whereby to rotate the tumbler; and a projection on said tumbler to move the lever to a locked position.

3. The combination, with a spindle and a knob revolubly mounted thereon, of a locking-lever carried by the knob and adapted to engage the spindle; means for retaining said locking-lever normally out of engagement with the spindle; a tumbler; a key for operating said tumbler to move the locking-lever into engagement with the spindle; and means for retaining the locking-lever in engagement with the spindle after the key has been withdrawn and the tumbler has returned to its normal position, substantially as set forth.

4. The combination, with a locking-lever; a locking-arm on said lever; a pin for engaging said lever, and a spring for moving the pin in one direction; of a revoluble tumbler provided with projections on its periphery, and a key provided with cut-out portions to correspond with the projections on said tumbler whereby to engage said projections, revolve the tumbler, and operate the lever.

5. In a lock the combination with a revoluble tumbler having a recess or groove in its periphery, of interchangeable pieces containing projections adapted to be inserted and secured in said recess or groove, and a key having cut-out portions to correspond with the projections on the tumbler and adapted to turn the tumbler when moved tangentially thereto.

6. The combination with a latch-spindle and a knob mounted loosely thereon, of a locking-arm connecting said knob and spindle, a pin for locking said arm, a tumbler mounted in the knob and having peripheral projections, and a key adapted to enter the knob, coöperate with said tumbler and release the locking-arm from said pin whereby to permit said pin to assume its normal position and release the locking-arm from the spindle, substantially as set forth.

7. The combination with a knob and spindle, of a pivoted locking-lever carried by one part and adapted to engage the other part, a revoluble tumbler having a peripheral projection to engage and operate said locking-lever, and a series of removable peripheral projections representing characters on said tumbler, and a key adapted to mesh with said peripheral projections and rotate the tumbler, substantially as set forth.

8. In a lock, the combination with a support, of a revoluble tumbler comprising two parts removably secured together and interchangeable peripheral projections held in place by the two parts of the tumbler.

9. In a lock, the combination with a support, of a revoluble tumbler comprising two parts adapted to screw one into the other and each having a peripheral projection, and interchangeable devices held between the peripheral projections of the two parts of the tumbler and projecting beyond the same, substantially as set forth.

10. In a lock, the combination with a support, of a revoluble tumbler having a recess or cut-out portion in the periphery thereof, sections containing projections adapted to be secured in said cut-out portion, a locking-lever attached to said support, a projection on said tumbler adapted to move said lever to a locked position; means for turning said tumbler; and means for retaining said lever in its locked position.

11. In a lock, the combination with a spindle, of teeth on said spindle, a lever adapted to engage said teeth, a revoluble tumbler provided with projections on its outer edge, a spring normally holding said lever out of engagement with said teeth; and means for operating said tumbler, releasing said spring and operating said lever.

12. In a lock, the combination with a knob and a spindle, of a sleeve mounted loosely on said spindle, and a shank mounted on and secured to said sleeve, a locking-key within said shank adapted to engage the knob and lock the shank and knob together, and means in said knob for locking the shank to the spindle, substantially as set forth.

13. In a lock, the combination with a spindle having teeth on one end thereof, of a sleeve mounted loosely on said spindle, a shank secured to the sleeve, a lever mounted on the shank and adapted to engage the teeth on the spindle, means mounted on the shank for operating said lever; and a knob inclosing said lever and operating means.

14. The combination in a lock, of a revoluble tumbler, projections on said tumbler, a key provided with cut-out portions to correspond with the projections on said tumbler and provided with a beveled end, a spring having arms thereon normally in the path of said key and adapted to be pushed out of the way by the beveled end of said key.

15. The combination in a lock, of a spindle, a locking-lever adapted to engage the spindle, a spring adapted to hold said lever out of engagement with the spindle, a revoluble tumbler provided with peripheral projections; and a key provided with cut-out portions corresponding with said projections and adapted to turn said tumbler and push said spring out of engagement with said locking-lever.

16. The combination with a latch or bolt spindle, of a knob rotatable therewith or independently thereof; a shiftable locking device for connecting said knob directly with said spindle thereby to permit it to be operated by the knob; and a tumbler having peripheral key-engaging projections operated by a key for actuating said locking device.

17. The combination with a latch or bolt spindle and a knob rotatable therewith or independently thereof, of means in said knob effective to connect said knob with or disconnect it from the spindle and comprising a shiftable device and rotary actuating means, and a spring in position to be engaged and shifted by a key and effective to prevent the operation of said shiftable device until shifted by said rotary actuating means.

18. The combination with a latch or bolt spindle carrying a working part, of a knob rotatable with said spindle or independently thereof; means located in said knob for connecting it with the spindle and comprising a member having a working part coöperating with the working part of the spindle; means comprising a tumbler for shifting said connecting means into position to connect the knob with the spindle and having peripheral key-engaging projections; and means in position to control the operation of one of said means until the mechanism is operated by the proper key.

19. In a lock, the combination with a latch or bolt and a knob adapted to be connected therewith to shift the same, of means for connecting said knob with said latch or bolt; means for shifting said connecting means; and means for holding said connecting means in engagement with said actuating means and for preventing the movement of said connecting means until said holding means is freed from its engagement with said connecting means by the engagement of the key therewith.

20. In a lock, the combination with a latch or bolt and a knob adapted to be connected therewith to shift the same, of means for connecting said knob with said latch or bolt; means for shifting said connecting means; and a spring for holding said connecting means in engagement with said actuating means and for preventing the movement of such connecting means until said spring is engaged by the key and shifted thereby free of said connecting means.

21. In a lock, the combination with a latch or bolt and with a knob, of a tumbler for controlling the operation of said latch or bolt and having peripheral key-engaging means; a device adapted to be actuated by said tumbler; and means for preventing the operation of said device by said tumbler until released by a key, the organization being such that the key will first shift the tumbler by engagement with a part of said key-engaging means a predetermined distance, then release said device, and then further shift the tumbler by its engagement with another part of said key-engaging means.

22. In a lock, the combination with a latch or bolt and with a knob, of a tumbler for controlling the operation of said latch or bolt; means adapted to be actuated by said tumbler; and means engaging said means for preventing the operation thereof by said tumbler until released by the key.

23. In a lock, the combination with a latch or bolt, of a member comprising a rotary tumbler for controlling the movement of said bolt and having peripheral key-engaging projections; a member intermediate said tumbler and latch or bolt; and means engaging and preventing the operation of one of said members until said means is engaged and released by the key.

24. In a lock, the combination with a latch or bolt, of a member comprising a tumbler for controlling the movement thereof; a member intermediate said tumbler and latch or bolt; and a spring engaging and preventing the operation of one of said members until engaged and released by the key.

25. In a lock, the combination with a latch or bolt, of a tumbler; a device in engagement with said tumbler; and a device for holding said device in engagement with said tumbler, the organization being such that after the tumbler is partially shifted by the key the key will actuate one of said devices and free it from engagement with the means with which it engages, and will then subsequently continue to shift the tumbler.

26. In a lock, the combination with a latch or bolt, of a rotary tumbler; a device in engagement therewith; and a spring for holding said device in engagement with said rotary tumbler, the organization being such that the key will rotate said tumbler a predetermined distance, then positively engage said spring and free it from engagement with said device, and then continue to rotate said tumbler.

27. A lock mechanism comprising, in combination with a latch or bolt, a tumbler having peripheral key-engaging projections; a device comprising an arm or lever in position to engage said tumbler; and a device for maintaining said arm or lever in such position, the organization being such that before the bolt can be shifted into its unlocking position one of said devices must be shifted by the key.

28. A lock mechanism comprising, in combination with a latch or bolt, a rotary tumbler having key-engaging projections; a device in engagement with said tumbler; and a device for maintaining said device in such position, the organization being such that before the bolt can be shifted into its unlocking position the tumbler must be rotated a predetermined distance by the coöperation of the key with a part of such projections, one of such devices shifted by the key, and the tumbler further rotated by the coöperation of the key with another part of such projections.

29. In a lock mechanism, the combination with a latch or bolt, of a device comprising a tumbler adapted to be actuated by a key; a device for preventing the movement of said bolt into its unlocking position; and means interfering with the operation of one of such devices until engaged and directly actuated by the key, the organization being such that the key must first operate the tumbler a predetermined distance, and then shift said interfering device.

30. In a lock mechanism, the combination with a latch or bolt; a rotary tumbler having a projection or projecting surface and peripheral key-engaging projections; a device engaging said projecting surface during a predetermined period; and a device for holding said device in engagement with said surface, the organization being such that the tumbler will be rotated a predetermined distance by the coöperation of the key with part of said projections, whereupon the key will engage and actuate one of said devices, and then further rotate said tumbler by its engagement with another part of said projections.

31. In a lock, the combination with a rotatable tumbler having peripheral projections adapted to be engaged by a key having recesses corresponding with such projections, of a lever pivoted for swinging movement and in position to engage said tumbler and having its movement controlled by said key.

ALAN ROBB FERGUSSON.

Witnesses:
C. A. WEED,
GEO. N. SEARS.